Figure 1:
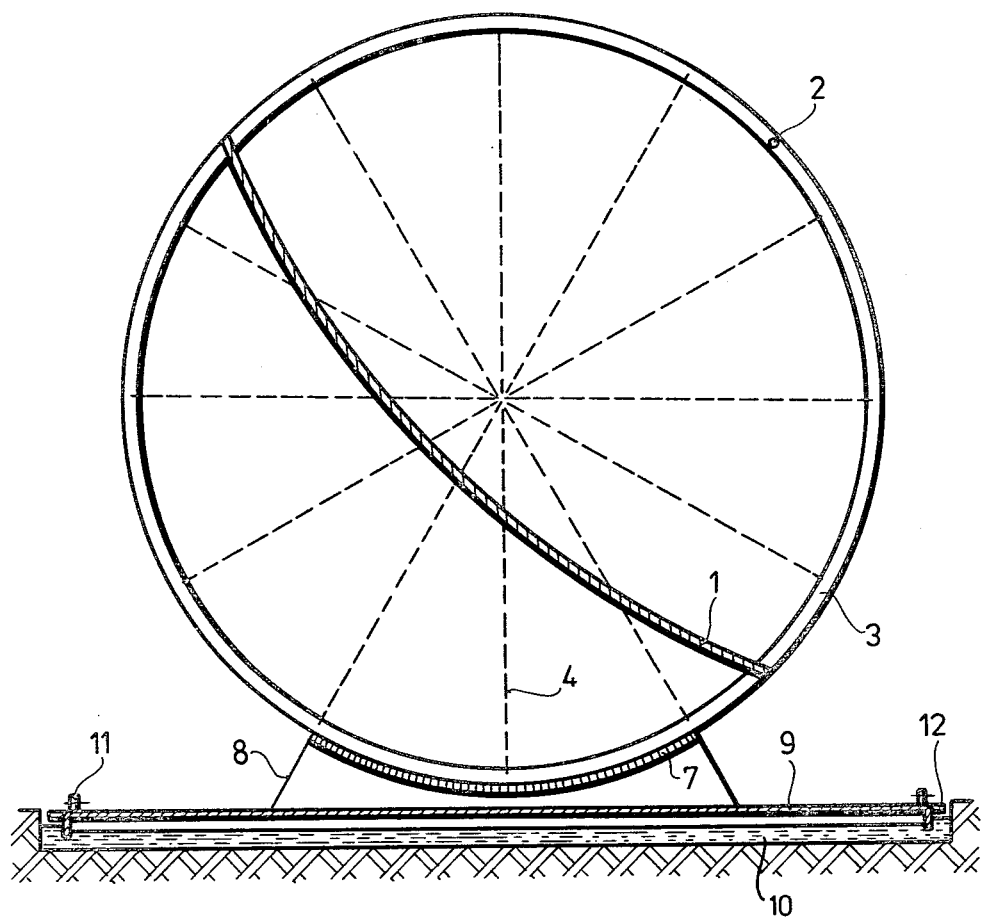

United States Patent [19]

Tiboldi

[11] 4,455,833
[45] Jun. 26, 1984

[54] SOLAR WHEEL

[75] Inventor: János Tiboldi, Budapest, Hungary

[73] Assignee: Vilati Villamos Automatika Fovallalkozo es Gyarto Vallalat, Budapest, Hungary

[21] Appl. No.: 263,018

[22] Filed: May 12, 1981

[30] Foreign Application Priority Data

May 13, 1980 [HU] Hungary .............................. 1176/80

[51] Int. Cl.³ ............................................ F03G 7/02
[52] U.S. Cl. ................................. 60/641.15; 60/698; 126/415; 126/424
[58] Field of Search .................. 126/415, 424, 438; 60/641.15, 641.8, 698, 398; 180/116, 125; 114/67 A

[56] References Cited

U.S. PATENT DOCUMENTS

| 4,030,890 | 6/1977 | Diggs | 60/641.15 X |
| 4,146,015 | 3/1979 | Acker | 126/415 |
| 4,159,427 | 6/1979 | Wiedemann | 60/698 X |
| 4,159,629 | 7/1979 | Korr et al. | 60/641.15 |
| 4,206,608 | 6/1980 | Bell | 60/698 |

Primary Examiner—Allen M. Ostrager
Assistant Examiner—Peggy A. Neils
Attorney, Agent, or Firm—Young & Thompson

[57] ABSTRACT

A power system for utilizing solar energy, comprises a carrier, a converter for converting the heat of the sunlight into another form of energy, and mirrors for focusing sunlight onto the converter. The mirrors are mounted in a cylindrical frame which rolls about its horizontal axis on a plurality of rollers carried by a support on a circular table which is supported by an air cushion on a body of water within a basin. The table rotates about a vertical axis to cause the reflectors to follow the apparent horizontal daytime path of the sun; and the frame rotates about its horizontal axis thereby to make the reflectors follow the apparent daytime vertical movement of the sun.

8 Claims, 4 Drawing Figures

SOLAR WHEEL

The invention relates to a solar wheel for the utilization of solar energy. The solar wheel is a mechanical unit for the conversion of solar energy to other utilizable (e.g. electric) energy.

In today's energy-consuming world an ever increasing need has been manifest in the efforts aimed at replacing the traditional energy generators with new ones. This is necessary the more so, since according to competent estimations the oil at the linear rate of the present utilization will be used up by the third decade of the 21st century. Assuming such increasing rate the fossil store of energy too will be exhausted within a foreseeable time, around the year of 2100. The danger is so realistic, that according to the solar energy programme of the U.S.A. in the year of 2000 20% of our energy requirement and around 2040 practically our total energy requirement will be supplied from solar energy.

The energy conversion in the solar power plants built to meet this requirement is generally carried out by a unit consisting of steam boiler, steam turbine (heat engine) and generator. There are also other means for utilization of the collected solar energy, such as collectors or solar cells.

In connection with the solar power plants the collection of the solar energy represents the greatest problem. A mirror system is arranged on a suitably selected terrain, for instance on a hill side surrounding a suitable valley, which concentrates the incident sunshine at a single square meter "focal point" of a 60 m high concrete tower. The mirror system includes a large number of small mirrors turned around two axes towards the sun by computer-controlled motors, and the mirrors are guided at with high accuracy with the aid of lasers to reflect the light precisely onto the heat collector. This means, that a 100 MW solar power plant requires 7 km$^2$ ground surface. Utilization of the area is 10–12%, meaning that 10–12% of the area is useful mirror surface. This causes no problem where the ground is unsuitable for cultivation, as for instance in deserts, but valuable land areas can not be wasted this way. Thus in the temperate zone—where the sunshine is less intensive—applicability of the known systems is questionable.

This is aggravated by the problem of control. Each mirror has to be turned around two axes to follow the sun in vertical and horizontal direction. Each direction requires driving. The position of each mirror is to be co-ordinated so as to reflect the solar energy always to the "focal point" of the system. This requires the precise aiming of the focal point. The simultaneous, permanent and co-ordinated actuation of the large number of motors is possible only with a complicated computerized system.

In addition, it is of no avail to increase the size of the mirrors in this system over a certain limit, since the large mirrors would cast shadows on each other, thus they would have to be arranged even farther from each other, involving further space requirements. Moreover the increased weight would result in nearly insoluble problems in respect of the emplacement and movement of the mirrors.

These factors—besides many others—represented serious impediments to the utilization of the solar energy.

The invention is aimed at elimination of all difficulties outline above, and at the realization of such solar wheels as energy producing units for the utilization of solar energy, the area—utilization of which is far better than that of those known so far, its movement control does not require a complicated computerized system, and the energy producing unit is capable of producing a considerable amount of energy even under the meteorological conditions of the temperate zone.

Accordingly the invention is aimed at the realization of an energy producing unit suitable for utilization of the solar energy.

The invention is based on the recognition, that the set objective is attained in a simple way by arranging the energy-collecting mirror surface and energy-utilizing power machine in a mechanical unit, and by producing a large collecting surface. Thus the solar wheel according to the invention is an energy producing unit for utilization of the solar energy, in which the further development is represented by having a part utilizing the solar energy and an energy carrier mechanism provided with a vertical and horizontal sun-following system.

The solar wheels can be made suitable for the utilization of wind power in addition to the solar energy, if according to the invention at least one wind power utilizing wind power plant is mounted on the carrier mechanism. This is a particularly advantageous construction, since—as seen in the following—the energy production of the solar wheel may be doubled under the conditions of the temperate zone.

The vertical sun-following system according to the invention is suitably formed by providing it with giant wheels carrying the solar energy utilizing part and being firmly fixed to each other, furthermore with a supporting base and rollers embedded in the base and arranged between the giant wheels and the base, as well as with a drive for rolling down the giant wheels on the supporting rollers. This way—despite the substantial weight—the vertical sun-following system will be easily achieved because each supporting roller carries a light weight, which does not hinder the turnability of the system in the vertical plane.

The horizontal sun-following system according to the invention is provided with a floating basin suitably filled with a liquid, with circular table arranged in it and connected to the base, with centralizing and anti-tilting rollers connected to the circular table and floating basin, as well as with a drive for moving the circular table in relation to the basin, wherein the circular table is provided with an air cushion. This solution enables the turning of the circular table with a large surface and burdened with the total weight of the solar wheel in a very simple way, since turning of the circular table floating in the basin filled with liquid does not generate friction apart from the friction of the liquid.

The wind power plants of the solar wheel utilizing the wind power according to the invention, are mounted suitably on one of the extreme giant wheels of the solar wheel and their blade diameter is less than 50 meters, suitably between 18 and 22 m. In this case always undisturbed wind hits the power plants and they are always easily turned into the wind. The suitable dimensions partly enable the optimal utilization of the wind and partly the allocation of several wind power plants will become possible.

According to the invention it is advisable to form the solar energy utilizing part as a conventional collector and/or a similarly conventional solar cell. This way the energy is directly obtainable.

According to another suitable solution the solar energy utilizing part is provided with a mirror and energy-transferring power plant group, wherein the mirror is a parabolic mirror consisting of flat pieces of mirror, and the group of plants is arranged at the focal point of the mirror. This way a very efficient collection and conversion of the solar energy becomes possible.

The invention is described in detail by way of examples with the aid of the accompanying, in which:

FIG. 1. Side view, partially in drawings section of the solar wheel according to the invention, FIG. 2. Front view, partially in section of the solar wheel according to FIG. 1., FIG. 3. Side view and partial section of another embodiment of the solar wheel according to the invention, FIG. 4. Top view showing the layout of the solar wheel according to the invention.

Figure 2:
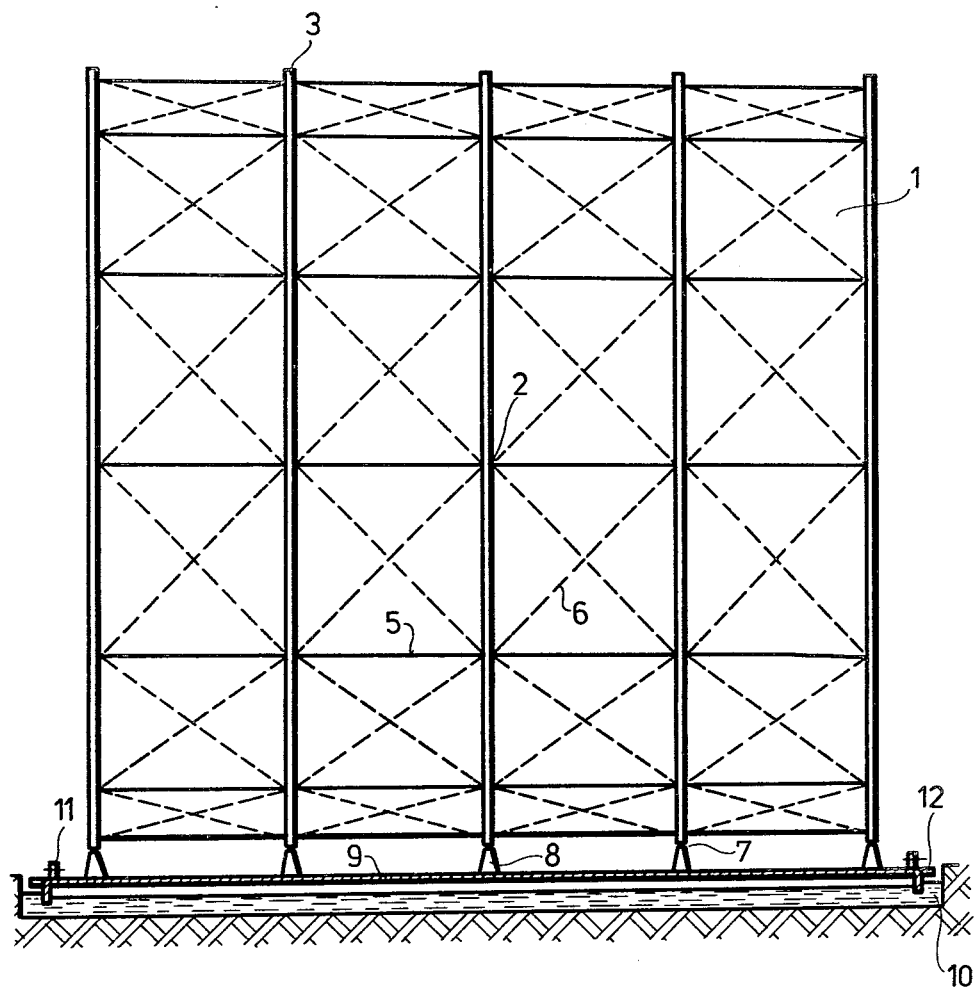

A parabolic mirror 1 for collection of the incoming sun rays is arranged in the embodiment of the solar wheel according to the invention shown in FIG. 1. A group of power plants are arranged at the focal point of the mirror 1, whereby the thermal energy—in this example—is converted to electric energy. The mirror 1 and group of power plants 2 form the solar energy-utilizing part of the solar wheel. These are supported by the carrier mechanism of the solar wheel, consisting of giant wheels 3 parallel with each other as shown in FIG. 2. The giants wheel 3 together with the elements fixing their position form a latticed structure. The reinforcement is ensured by spokes 4, the cross bracing with spacers 5 and braces 6 (FIG. 2.) The spokes 5 and braces 6 are used for tensioning, thus they do not have to be of rigid material, but for instance wire ropes may be suitable. This enables the construction of the carrier mechanism of adequate strength at low dead weight.

The so-assembled giant wheels 3 are supported by base 8 from underneath, via supporting rollers 7. The surface of the base 8 facing the giant wheels 3 is formed in such a way, that it surrounds the giant wheels 3 as a cradle over a certain portion of their circumference. The supporting rollers 7 are rotatably embedded in base 8, thus the giant wheels 3 bear upon these supporting rollers 7 in rollable condition. The vertical sun-following system is ensured by such construction of the giant wheels 3, supporting rollers 7 and base 8. This is associated with the drive, not shown in the diagram, with the aid of which movement of the giant wheels 3 is controlled in relation to the base 8.

As a result of this solution neither great force is required for turning, nor special bearing for bedding of the supporting rollers 7. The weight of the solar wheel is distributed to as many giant wheels 3 as are being used. Each giant wheel 3 is supported by a supporting roller 7 surrounding the circumference as a cradle, thus only a negligible part of the total weight will be borne by each supporting roller 7.

The rolling drive can be connected to one or several supporting rollers 7, when torque-transferring connection has to be brought about between the supporting rollers 7 and the respective giant wheels 3.

In order to realize the horizontal sun-following system in a simple way, the base 8 is arranged on the circular table 9. The circular table has an air cushion: in assembled condition of the solar wheel it floats in a basin 10 filled with liquid. The air cushion construction in this embodiment is realized by making the circular table 9 of U-shaped cross section, as shown in the cross section of FIG. 1, which enables the enclosure of a certain air cushion. The circular table may be provided with a valve, through which pressurized air is pumped under the U-shaped circular table 9, whereby the solar wheel can be easily lifted out of, or lowered into the basin 10. This solution at the same time allows to lower the solar wheel to the bottom of the basin 10 in case of excessive wind load, thus protecting it from overturning.

The position of the circular table 9 in the basin 10 is set with the anti-tilting rollers 11 and centralizing rollers 12. Some of these are connected to the vertical and horizontal flange of the circular table and some to the basin 10. One or even several of these rollers are provided with a drive (not shown), thereby taking care of the controlled horizontal sun-following.

This solution makes all other kinds of bearing unnecessary. The liquid in the basin 10 may even be water, turning of the air cushion type solar wheel requires minimal power even under extreme meteorological conditions. This is significant especially in case of sudden high wind, when the solar wheels are quickly set into the wind, i.e. the longitudinal axis of the solar wheel is set parallel with the wind direction.

Figure 3:
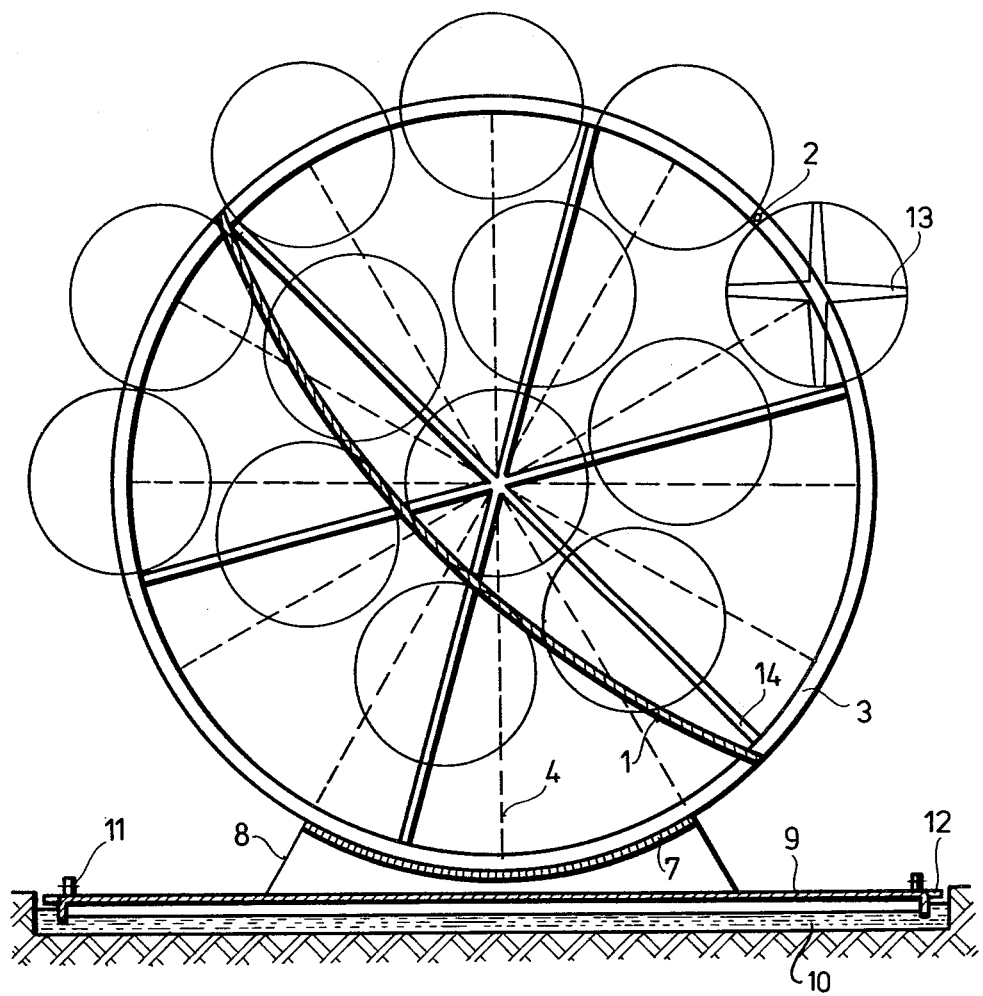

This is the case when the wind power plants 13 mounted on one of the extreme giant wheels 3 have a role in another embodiment of the solar wheel shown by way of example (FIG. 3). The plane of the blades of the wind power plants 13 is parallel with the plane of the giant wheels 3, which when the solar wheel stands in the direction of the wind, is perpendicular to the wind direction.

Several wind power plants 13 may be arranged on this extreme giant wheel 3, the more so since it was verified by experiments that the wind power is used most effectively by those wind power plants, the blade diameter of which is around 20 meters. In the interest of mounting several wind power plants 13, the extreme giant wheel 3 can be supplemented with bridges 14 to increase the rigidity of this giant wheel 3. With this solution the wind power plants 13 are arranged on the giant wheel 3 in such a way that the arising forces partly counterbalance each other, thus they do not represent excessive load on the solar wheel. This way the solar wheel becomes suitable for the utilization of solar energy and/or wind power in a single mechanical unit.

For a better perception of the dimensions of the solar wheel according to the invention a concrete dimensioning is presented by way of example as follows. There are five giant wheels 3 in the solar wheel, their diameter 80 m and distance from each other 20 m. The spokes 4 are made of round iron, the spacers 5 of latticed construction and the braces 6 made of wire rope. In this case sixty spokes 4, sixty spacers 5 and 120 braces 6 are used. The giant wheels turn on 500, i.e. 100 supporting rollers 7 per giant wheel 3—in relation to the base 8.

The mirror is parabolic, and consists of sixteen $20 \times 20$ m latticed carrier panels, on which $1 \times 1$ m flat mirrors are fixed. The position of these flat mirrors is set once during production and no change is necessary afterwards. The useful surface of the so-formed mirror is 5640 $m^2$. This means that it has to catch the wind at over 8.5 m/s wind velocity.

The diameter of the circular table 9 is 90 m, height 1.5 m, made of latticed reinforced concrete a frame, on which 240 fibreglass reinforced synthetic domes are arranged. The positive pressure of the air cushion is 230 mm of water which in case of catching the wind, prevents the tilting up to 120 km/h wind velocity.

The inside diameter of the floating basin 10 is 90.2 m, height 1 m. The side wall is reinforced concrete construction provided with bracing, its bottom is made of concrete-synthetic materialsand bed.

The power plant group 2 arranged at the focal point of the parabolic mirror 1 is a thermal turbine connected to the coal dust-fed air heater and generator. The power output is 2.5 MW. There are thirteen wind power plants 13 with 20 m blade diameter arranged on one of the extreme giant wheels 3. Average power output is 100 kW per wind power plant.

In view of the Hungarian meteorological conditions 1000 utilzable sunny hours per year and 3.6 m/s average wind velocity at the height of 20 m can be reckoned with. Thus the solar power plant produces 2.5 million KWh and the wind power plant similarly 2.5 million KWh electric energy per year. Thus the energy obtainable with the solar wheel is 5 million KW per solar wheel and per year.

Figure 4:
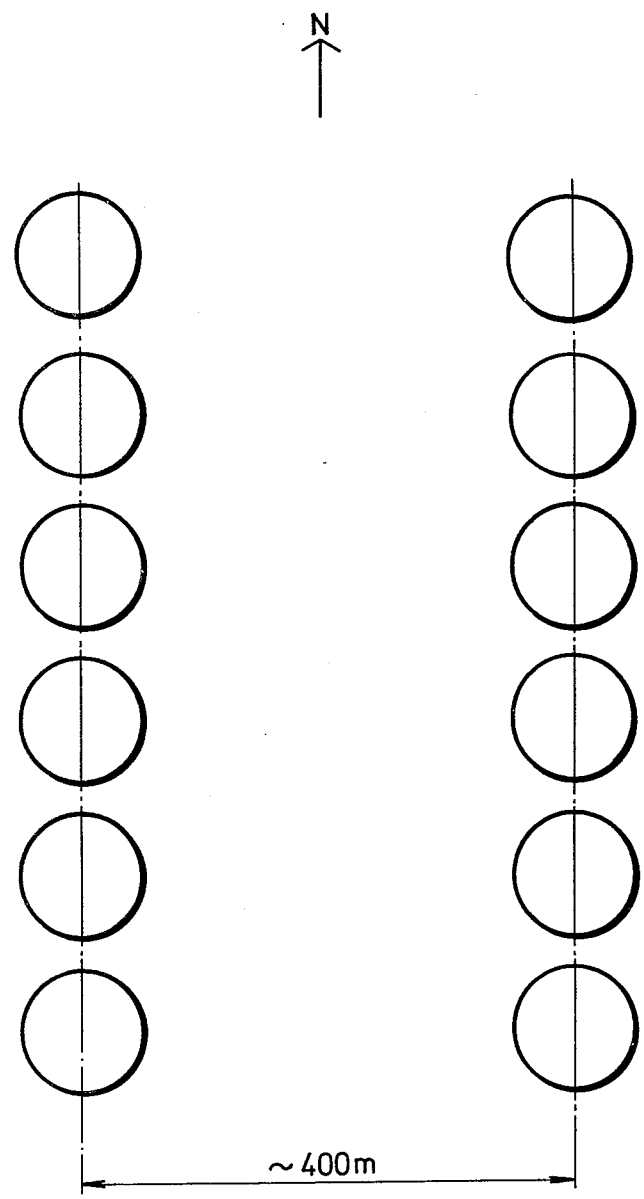

A very significant advantage in connection with the solar wheel according to the invention is that 85% surface utilization is attainable with its use. This means it has a useful mirror surface corresponding to 85% of the occupied area. Besides, the solar power plant built up with solar wheels requires no land area taken away from the agricultural utilization. Namely in the interest of avoiding the solar wheels casting shadow over each other, a distance of 400 m has to be kept between the solar wheels arranged in one line as shown in FIG. 4, which is a well-utilizable area for agriculture even in case of mechanized cultivation.

No less important is the advantage of the solar wheel according to the invention, that the wind power utilization can be realized without extensive carrier mechanism, and thereby in case of installation in the temperate zone, the annual energy production can be doubled.

Summing up it can be laid down, that the use of the solar wheel according to the invention amounts to a qualitative improvement in the energy production with solar power plants. It was made suitable not only for utilization of the wind power, but its area utilization was increased by 85% instead of the earlier 10–20%, the vertical and horizontal sun-following were solved in a much simpler way, since aiming of the power plant group 2 is not necessary, the flat mirrors forming the parabola need not be moved during operation, thus maximal and uniform amount of solar energy will be received by the power plant group 2 arranged at the focal point of the parabola, and with the air cushion bedding of the circular table 9 many mechanical problems have been solved. Finally these solar power plants represent no pollution in respect of environment protection.

What we claim is :

1. A power system for utilizing solar energy, comprising a carrier, conversion means on the carrier for converting heat to another form of energy, reflector means on the carrier for focusing sunlight on said conversion means, means for rotating said carrier about a vertical axis in synchronism with the apparent daytime motion of the sun, means for rotating said carrier about a horizontal axis in synchronism with the apparent daytime motion of the sun, said carrier comprising a circular table having a substantially horizontal platform and a substantially vertical circular wall about the outer portion of the underside of said table, said table and wall being airtight, said wall being immersed in a basin which contains liquid and which has a greater free surface than the outer periphery of said table, there being an air cushion between the surface of the liquid and the underside of the table within said wall.

2. Structure as claimed in claim 1, said carrier including a frame carrying said reflector means, said frame having a cylindrical outer contour, a base on the table, the base having an upwardly concave part-cylindrical supporting contour on which said frame rests for rotation of the frame about the axis of the outer cylindrical contour of the frame.

3. Structure as claimed in claim 1, and a windmill on the carrier.

4. Structure as claimed in claim 1, said carrier including a cage made up of a plurality of circular wheels secured in horizontally spaced parallelism to each other and having a common horizontal axis.

5. Structure as claimed in claim 4, said conversion means being secured at the center of one of said wheels.

6. Structure as claimed in claim 4, said reflector means being secured within said wheels.

7. Structure as claimed in claim 1, and hold-down rollers and centering rollers carried by the basin and engaging the peripheral portions of the table.

8. Structure as claimed in claim 2, and a plurality of anti-friction rollers carried by said base for rotatably supporting said frame.

* * * * *